United States Patent [19]

Miller

[11] 4,207,000
[45] Jun. 10, 1980

[54] WAVEGUIDE METHOD FOR DETERMINING STRESS AT THE CONVEX SURFACE OF A BODY

[75] Inventor: Arthur Miller, Princeton Junction, N.J.

[73] Assignee: RCA Corporation, New York, N.Y.

[21] Appl. No.: 881,371

[22] Filed: Feb. 27, 1978

[51] Int. Cl.² .............................................. G01B 11/16
[52] U.S. Cl. ........................................ 356/33; 356/35; 356/73.1
[58] Field of Search ................................. 356/33–35, 356/365–368, 370, 73.1; 73/800; 250/225

[56] References Cited

U.S. PATENT DOCUMENTS 3,286,581  11/1966  Acloque et al. .................... 356/35

OTHER PUBLICATIONS

Acloque et al., "Method for the Photoelastic Measurement of Stresses in Equilibrium in the Thickness of a Plate (particular cases of Toughened Glass & Bent Glass)," Physics Abstracts, 10-1961, General Mechanics, Abst. #11725.

Sheem, S. K., "Three-Dimensional Curved Surface for Integrated Optics", App. Optics, vol. 14, 8-1975, pp. 1854–1859.

Sheem et al., "Modes of a Curved Surface Waveguide for Integrated Optics", Wave Electronics, vol. 1, 1974–1975, pp. 105–116.

Primary Examiner—John K. Corbin
Assistant Examiner—Wm. H. Punter
Attorney, Agent, or Firm—E. M. Whitacre; G. H. Bruestle; L. Greenspan

[57] ABSTRACT

Method comprises (1) introducing a polarized light beam into the convex surface of an optically-transparent body whereby the beam propagates in the body in a guided manner near the surface, (2) extracting at least a portion of the beam from the body through the surface at a distance from where the beam was introduced, (3) sensing the change in polarization state of the extracted portion of the beam occurring during its propagation in the body, and (4) calculating the value of stress from the sensed change in polarization state.

5 Claims, 2 Drawing Figures

WAVEGUIDE METHOD FOR DETERMINING STRESS AT THE CONVEX SURFACE OF A BODY

BACKGROUND OF THE INVENTION

This invention relates to a novel method for determining the stress at the convex surface of an optically-transparent body and particularly, although not exclusively, to a method of determining the stress at the external surface of the viewing window of a cathode-ray tube. The phrase "at the surface" is used herein to refer to a thin portion of a body at and near its surface as opposed to being in the interior or bulk of the body.

The susceptibility of the glass viewing window of a cathode-ray tube (CRT), or other optically-transparent body, to mechanical failure is determined largely by the magnitude and distribution of stresses induced in it during its manufacture. These stresses may be at the surface or in the bulk of the body. Stress at the surface is especially relevant because mechanical failures, such as a fracture in the body or an implosion of the viewing window of a CRT, generally originate at the free surfaces of the body and are governed by the stresses there.

The novel method employs the known elasto-optic effect whereby a medium becomes optically birefringent when it is stressed. The birefringence is measured by interference between differently polarized components of light. The determination of stress in the bulk of a body by such techniques is well known, as exemplified in U.S. Pat. Nos. 2,976,764 to W. L. Hyde et al, 3,183,763 to C. J. Koester and 3,902,805 to S. Redner. In general, stress as measured in the bulk, does not provide adequate information about the surface stresses. For example, the thermal effects employed during its manufacture will cause the surfaces of a fairly flat, free-standing glass body to be in compression, and the interior to be in tension. The compression and tension very nearly cancel the net elasto-optic effect observed along any light path that passes through the thickness of the body. As another example, the viewing window of a CRT, mechanically loaded by the air pressure on the outer side and vacuum on the inner side, has a nonzero resultant for the elasto-optic effect when measured along a light path that passes through its thickness. However, the outer side is in compression, the inner side is in tension, and the net observed effect is due to an unbalance of the oppositely-sensed stresses.

A number of methods have been used for determining the surface stress in a body. Each prior method is deficient in some respect when compared with the novel method. Strain gauges, elasto-optically sensitive coatings, and brittle coatings can measure only the changes in stress that result from forces applied after the body has been fabricated with stresses therein. Failure of the body is governed, however, by the absolute stress in the body, and not by the last changes in stress produced in the body. In differential refractometry, stress is determined by the elasto-optic effect whereby the critical angle for total internal reflection changes when the body is stressed. Because it is a noninterferometric technique, its sensitivity and accuracy are limited. This method appears to be useful primarily where large, compressive stresses are deliberately induced in the surfaces of materials in order to strengthen them. In the notch polariscope method, parallel notches are cut into the surface of the body to be measured, and light is directed through the body from one notch to the other. Detection and measurement of the birefringence are by conventional means, involving crossed polarizers and possibly compensators, etc. Measurements can be made as a function of depth below the surface. Drawbacks of this method are that it is destructive, and that cutting the notches may perturb the stress distribution in the body.

It has also been suggested privately that, if the surface of the body to be tested is somewhat convex, as is the case for a kinescope face panel, then a light beam can be propagated along a chord that travels near the surface and intersects the surface at input and output regions. This method is impractical because, when the effects of diffraction are taken into account, it is necessary that the beam have appreciable width in order for it not to diverge by more than its width as it propagates through the medium to be tested. This in turn implies that there is a minimum depth through which the lowest part of the beam traverses. For desired values of the propagation length, this depth may be undesirably far away from the surface. This method would be satisfactory if the light beam could be made to propagate only at the surface without spreading due to diffraction. In optical waveguides, light behaves exactly in this desired manner. However, in optical waveguides the light is usually confined to a thin film that has a refractive index that is higher than that of the substrate on which it is supported; as disclosed, for example, in U.S. Pat. Nos. 3,584,230 to P. K. Tien and 3,883,221 to W. W. Rigrod.

What makes the novel method possible is the phenomenon, reported by S. Sheem et al in *Wave Electronics* 1 (1974) 105–116 and S. Sheem in *Applied Optics* 14 (1975) 1854–1859, that a convex body whose refractive index is spatially homogeneous behaves like a planar object with a refractive index that increases towards the surface. Guided wave propagation can therefore occur solely along a single surface of such a body. In the latter article, there is described a method in which a light beam from a He-Ne laser is coupled through a prism to the surface of a cylindrical rod or to a cylindrical tube, and the light beam propagates along the convex surface of the body in a guided manner.

SUMMARY OF THE INVENTION

The novel method for determining the stress at a convex surface of an optically-transparent body comprises first introducing a polarized light beam into said body through said surface, whereby said beam propagates at the surface of the body in the guided manner described in the above-cited articles. At least a portion of the beam is extracted from the body through the surface of the body at a distance from where the beam is introduced. The change in polarization state in the beam occurring during its propagation in the body is sensed, and the value of stress is calculated from this change in polarization state.

The method is practical for a convex surface with a radius of curvature of less than 4000 centimeters. The beam may be introduced and extracted with prisms and/or diffraction gratings or other means positioned against the surface in a known nondestructive manner. The distance between introducing and extracting the beam may be about 1 to 10 centimeters, so that stress over relatively short or long distances may be determined. Optical coupling between the prisms or other means and the surface may be improved by filling the intervening space with a high refractive index liquid.

The novel method is particularly adapted for nondestructively testing the viewing windows of finished cathode-ray tubes to determine whether the residual stress in a localized area of the window is below some prescribed level. Since the window must resist large forces resulting from manufacturing processes, atmospheric pressure, and the implosion protection system, the stresses may vary greatly across the surface, and some localized surface areas may have large compressive or tensile stress. Early detection of excessive stress may permit action to avoid a failure of the window in the field. The novel method is not only capable of determining localized surface stress in the viewing window, but also may be practical and cost effective to perform in a factory.

DETAILED DESCRIPTION OF THE PREFERRED EMBODIMENTS

The novel method is described with respect to determining the stress in a localized surface area of the glass window of a CRT. However, the novel method may be used to determine the stress in a localized surface area of other bodies that are transparent to the light beam that is employed. Thus, the novel method can be used on bodies of glass or plastic, and the bodies can be of any shape and useful for any purpose or no purpose. However, the novel method can be used only to determine the stress in convex surfaces for the reasons which are developed below.

Figure 1:
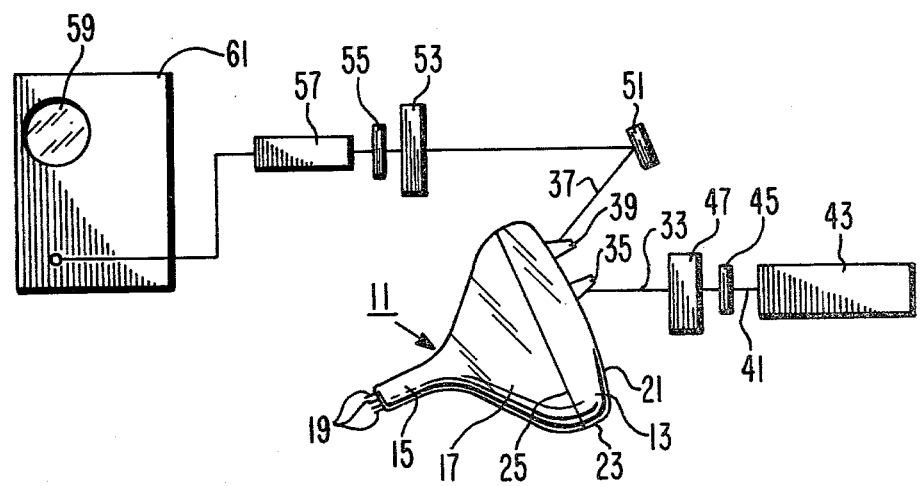
FIG. 1 is a partially-elevational, partially-schematic diagram of a system for determining the stress in a localized surface area of a CRT window by the novel method.
Figure 2:
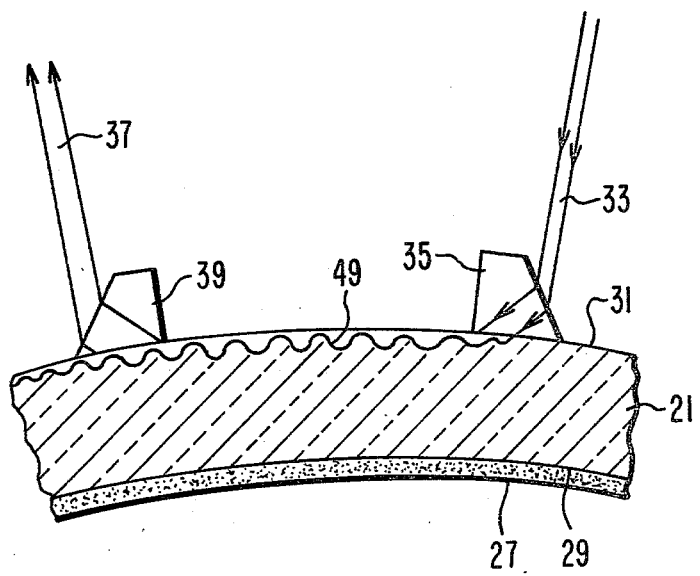
FIG. 2 is a sectional view of that portion of the window shown in FIG. 1 where the stress is being determined.

The CRT shown in FIGS. 1 and 2 comprises an evacuated bulb 11 or envelope which includes a glass faceplate panel 13 at its front end, a glass neck 15 and an interconnecting funnel 17. The neck 15, which is closed at its distal end by a stem, houses an electron gun that is supported on stem leads 19 which extend through the stem. The panel 13 includes a glass viewing window 21 and an integral, rearwardly-extending glass sidewall 23. The panel 13 closes and is sealed to the large end of the funnel 17 along the seal line 25 at the terminal end of the sidewall 23. A luminescent screen 27 is supported on the inner surface 29 of the viewing window 21. The interior of the bulb 11 is evacuated to a vacuum of the order of $10^{-5}$ mm of mercury. Although it is not shown, there may also be an implosion protection system integrally combined with the tube 21.

In a typical setup as shown in FIGS. 1 and 2, the CRT 11 is a 25 V commercial color television tube. Such a tube has a window 21 whose external surface 31 has a radius of curvature of about 107 cm (42.1 inches). An input light beam 33 is coupled in through the surface 31 with an input prism 35. The output light beam 37 is coupled out through the surface 31 with an output prism 39 spaced about 2.5 cm from the input prism 35, although they could be spaced 1 to 10 cm apart. Both prisms 35 and 39 have a high index of refraction, and their contacting surfaces are shaped to provide good physical and optical contact with the external surface 31 of the window 21. Such prisms may be made of strontium titanate or of high refractive index glass.

While air may be used as the medium between each of the prisms 35 and 39 and the surface 31, it is preferred to apply a drop of a liquid with a high index of refraction so that, by surface forces, the liquid, referred to as a coupling liquid, displaces the air between the prisms 35 and 39 and the surface 31. The coupling liquid may have an index of refraction that is greater than that of the window 21. The use of a high refractive index coupling liquid is preferred because it increases the coupling of light between the prisms and the window 31. When the medium between the window 21 and the prisms 35 and 39 has a low refractive index, coupling is effected via an evanescent electromagnetic field that extends beyond the surfaces of the bodies. The use of the coupling liquid eliminates the exponential decay in the gap characteristic of evanescent waves and results in acceptably strong coupling. The use of the coupling liquid is preferred also because the surface tension of liquid provides a convenient way to hold the prisms in place without inducing new stresses and without degradation of the surface.

As shown in FIG. 1, the output light beam 41 from a 2 milliwatt helium-neon laser 43 is passed through an input polarizer 45 at 45° to the plane of the drawing and an acousto-optical birefringence modulator 47 at 0° producing the input beam 33 that has a time dependent polarization state, coupling. The polarized input beam 33 is fed into the input prism 35 into the window 21, where the wave 49 (FIG. 2) is guided at the surface 31 of the window 21 until it is extracted through the prism 39 producing the output beam 37. The output beam 37 is reflected by a front surface mirror 51 through a Soleil compensator 53 at 0°, then an output polarizer 55 at 315°, then to a multiplier phototube 57 where the change in polarization from input polarization to output polarization is sensed. The compensator 53 is set for an unstressed sample. Then, with a sample with unknown stress, the compensator 53 is adjusted to compensate for the change in the polarization state of the beam in the sample. The change in the setting of the compensator and therefore the change in retardation is indicative of the observed stress. The absolute stress S is calculated with the equation $$S = \Delta\Gamma/lC \qquad (1)$$

where $\Delta\Gamma$ is the change in retardation as derived from the change in the compensator setting, l is the effective path length in the sample and C is the experimentally-determined stress-optical coefficient for the glass of the sample, which is about $2.05 \times 10^{-8}$/psi for glasses used for the windows of color television picture tubes.

It is necessary that the angle of incidence of the input beam 33 on the face of the input prism 35 is properly adjusted so that output beam 37 is obtained from the appropriate face of the output prism 39. The angular tolerance was observed to be within a few minutes of arc. In laboratory tests, the intensity of the output beam 37 was such that it could readily be discerned in a normally illuminated room when it was projected onto a sheet of white paper. It is estimated that the output beam intensity was on the order of $10^{-4}$ that of the input beam 33. The output beam intensity was ample to excite a multiplier phototube. There was no observable dependence of the output intensity on the separation between the input and output prisms. The acousto-optical modulator 47 imposes an ac birefringent retardation on the steady-state retardation of the other components. Oscilloscope synchronization was derived from the ac signal used to drive the modulator 47. When the adjustable, calibrated retardation of the compensator 53 just cancels the steady-state retardation in the remainder of the system, the odd harmonics of the ac modulation of the photodetector output vanish. When this occurs, successive maxima in the photocurrent, as displayed on the screen 59 of the oscilloscope 61, are of equal amplitude. When compensation is not achieved, successive maxima have alternating amplitudes. The retardation of the window 21 is directly related to the Soleil compensator setting required for compensation. Greater sensitivity in setting the compensator 53 can be obtained by the use of a lock-in detector tuned to the fundamental of the modulation frequency, but this was found to be unnecessary.

In experiments performed on a section of glass cut from the window of a CRT, moderate finger pressure applied to the outer surface 31 perpendicular to the propagation direction of the wave 49 in the window 21 causes an unbalance distinctly visible on the oscilloscope trace. Finger pressure applied parallel to the propagation direction has no appreciable effect. The unbalance produced upon applying or relaxing finger pressure has two components, one of which varies immediately, and the other of which has a response time of a few tens of seconds. A much stronger response, but with a similar time constant, can be obtained by blowing hot air on the surface of the window section. The slowly responding component is absent when stress is applied with a clamp, rather than the fingers. The slow response is therefore believed to be thermally induced.

Experiment and calculation indicate that the individual guided modes are not resolved, and the conditions for coupling cannot be distinguished from those that would be obtained for classical ray-optical behavior. Whether or not individual modes can be resolved depends, when prism couplers are used, on the effective refractive indices of the modes. The approximate refractive indices $n_m$ for various modes are given by $$n_m = n - \left( \frac{9\lambda^2 v_m^2 n}{32\pi^2 R^2} \right)^{\frac{1}{3}}, \tag{2}$$

where
$\lambda$ is the free-space wavelength of the light,
$v_m$ is the m-th root of the Bessel function equation $$J_{1/3}(v) + J_{-1/3}(v) = 0, \tag{3}$$

n is the index of refraction of the guiding medium and R is the radius of curvature of the surface.

The calculated values of the effective refractive indices were used to infer the angle for each mode between the input and output beam and the face of the coupling prism. It can be shown that the changes in this angle between various low-order modes and the geometric-optical case (for which $n_m$ can be taken equal to n) are smaller than the uncertainty caused by diffraction of a beam with width equal to that of the input or output beams. An alternative way of stating this is that the laser beam diameter and prism coupling lengths are not sufficiently large to permit selective excitation of individual modes, as governed by phrase-matching considerations.

The utility of the method described here is governed by the effective depth below the surface within which the stress state of the medium is sensed. It can be shown that the effective depth will in no case be greater than the depth $x_r$ of the ray-optical chord, which is given by $$x_r \approx Z^2/8R, \tag{4}$$

where Z is the separation between the entrance and exit points of the ray. For R=107 cm and Z=2.5 cm, $x_r$=73.0 $\mu$m. The stress at this depth is estimated in our system to differ from that at the surface by no more than about 3%.

If it is desired to use larger values of Z, the effective depth can be limited below that implied by equation (4) provided that the laser beam diameter and the prism coupling lengths are sufficiently large to selectively excite individual modes. For the conditions quoted above, the required laser beam diameter and prism coupling lengths are both of the order of 1 cm. If the lowest-order mode is excited, the effective depth is given by $$x_1 = \left( \frac{9\lambda^2 v_1^2 R}{32\pi^2 n^2} \right)^{\frac{1}{3}}. \tag{5}$$

For $\lambda$=632.8 nm and n=1.518, which are appropriate for our system, the value of the effective depth $x_1$ is 31.3 $\mu$m. Note that, in this case, the effective depth remains constant regardless of the length Z of the light path through the medium.

The effective refractive indices of individual modes discussed above may, to a certain extent, affect the birefringent retardations. Even in an absolutely isotropic, stress-free body, the effective refractive index of a transverse-electric (TE) wave of a given mode number is expected to differ somewhat from that of the transverse-magnetic (TM) wave with the same mode number. This difference in effective refractive index is superposed in our system upon the birefringence caused by stress. If this "false birefringence" is fairly independent of mode number, correcting the experimental observations to account for it poses no particular problem. If, on the other hand, it depends on the mode number, then the extra contribution will vary as different modes are excited to different degrees, which can occur if even small changes are made in the coupling geometry. This would seriously hamper the usefulness of the method described here for stress measurements. Part of the concern for this arose when fairly large changes in the birefringence were observed for small changes in the position and orientation of the incident beam. It was subsequently shown that the observed changes were due to spurious birefringence in one of the coupling prisms.

Equation (2) above is only an approximate relationship and does not distinguish between TE and TM modes. In a treatment of a similar problem by E. M. Conwell, "Modes in Optical Waveguides Formed by Diffusion," *Applied Physics Letters* 23, (1973) 328, it was concluded only that an expression containing the effective refractive index for the TE modes lies close to the zeroes of a higher-order Bessel's function, and that the similar expression for TM modes lies even closer to the zeroes. A wave-optical treatment of curved waveguides with sufficient accuracy to evaluate the refractive-index differences between TE and TM modes can be made with some simple numerical analyses. By analysis with wave-optical theory of light propagation in cylindrical guides of large radius, it can be shown that for the lower order modes the difference $n_{TE}-n_{TM}$ between the effective refractive indices for TE and TM modes is essentially independent of mode number, and can be represented very nearly as $$n_{TE} - n_{TM} = \frac{\lambda \sqrt{n^2 - 1}}{2\pi R n}. \tag{6}$$

For the parameters appropriate to our experiments, this difference has the value $7.08 \times 10^{-8}$, which is smaller by almost three orders of magnitude than the refractive-index differences between successive modes implied by equation (2). The stress-optical effect in glass CRT windows can be expressed by $\Delta n$ per p.s.i. $\approx 2.05 \times 10^{-8}$. The net result is that the $n_{TE}-n_{TM}$ term superposes an artificial birefringence equivalent to about 3.5 p.s.i. of tensile stress onto the stress birefringence. Although the magnitude of this extra contribution corresponds to a stress that can readily be detected by the method described here, it can probably be neglected for most applications.

Many methods other than the combination of acousto-optical birefringence modulator, Soleil compensator, etc., described here are known to the art for analyzing the change in polarization state of light upon passage through a birefringent test object. These methods are in general applicable to the system described here for stress determination at surfaces.

If the object whose stresses are to be analyzed is not transparent, a model of it can be made, e.g. out of transparent plastic, and appropriately measured. If the object has planar, or nearly planar surfaces, it may be possible to make a model of it as described above, but whose surfaces are modified so as to make them sufficiently convex to permit measurements by the described method, but not so different from the original object so as to appreciably alter the stress distribution.

I claim:

1. A method for determining the mechanical stress at the convex surface of an optically-transparent body, said convex surface having a radius of curvature of less than 4000 centimeters, comprising
   (1) introducing a polarized light beam into said body through said surface, whereby said beam propagates in said body near said surface,
   (2) extracting at least a portion of said beam from said body through said surface a distance from where the beam was introduced,
   (3) sensing the change in polarization state of said beam during its propagation in said body along a path length l and
   (4) calculating the value of mechanical stress S from said change in polarization state according to the following relationship:
   $S = \Delta \Gamma / lC$ where
$\Delta \Gamma$ = change in retardation over the path length l and
C = stress-optical coefficient for the body, and subtracting that value which is due to false birefringence.

2. The method defined in claim 1 wherein said convex surface has a radius of curvature of about 107 centimeters.

3. The method defined in claim 1 wherein the distance between said introducing and said extracting of said beam is between about 1 and 10 centimeters.

4. The method defined in claim 1 wherein said introducing of said beam comprises positioning a prism on said convex surface, filling the space between said surface and said prism with a liquid having an index of refraction that is greater than that of said body, and then directing said beam into said prism toward said surface.

5. The method defined in claim 1 wherein said extracting of said beam comprises positioning a prism on said convex surface at a distance along the path of propagation of said beam in said body from where said beam is introduced, filling the space between said surface and said prism with a liquid having an index of refraction greater than that of said body.

* * * * *

UNITED STATES PATENT AND TRADEMARK OFFICE
CERTIFICATE OF CORRECTION

PATENT NO. : 4,207,000

DATED : June 10, 1980

INVENTOR(S) : Arthur Miller

It is certified that error appears in the above-identified patent and that said Letters Patent is hereby corrected as shown below:

Column 4, line 27     delete ", coupling"

Signed and Sealed this

Nineteenth Day of August 1980

[SEAL]

Attest:

SIDNEY A. DIAMOND

Attesting Officer     Commissioner of Patents and Trademarks